United States Patent Office 2,782,165
Patented Feb. 19, 1957

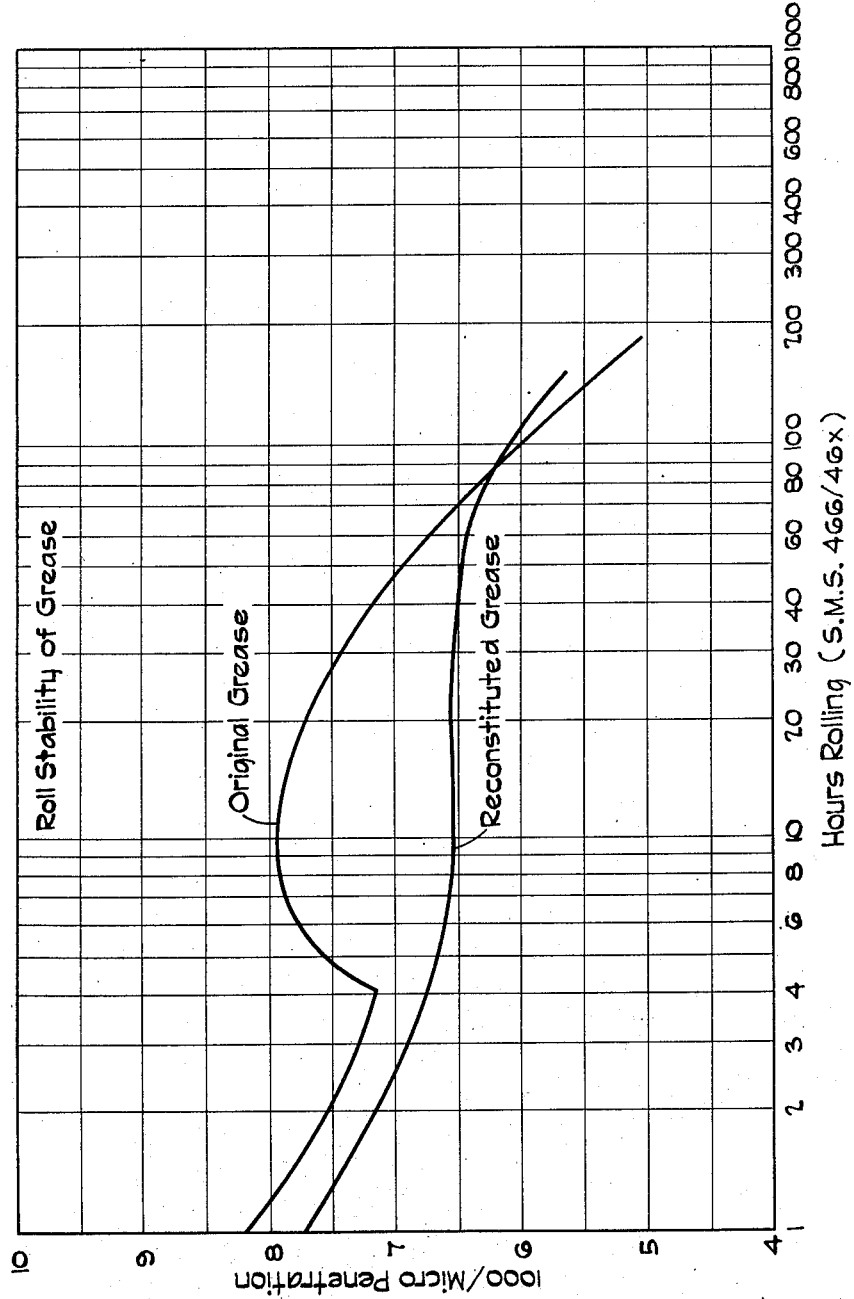

2,782,165

GREASE COMPOSITIONS

Walter H. Peterson, Point Richmond, and Arnold A. Bondi, Berkeley, Calif., assignors to Shell Development Company, Emeryville, Calif., a corporation of Delaware Application May 10, 1951, Serial No. 225,624

14 Claims. (Cl. 252—41)

This invention relates to soap greases and to improved method of grease manufacture as well as to the method of making and using a new and novel soap product in said grease manufacture.

Greases made from well-known gelling agents such as conventional soaps well known in the grease making art, or unconventional grease gelling agents such as carbon blacks, modified clays, inorganic aerogels, polymeric materials, phthalo cyanine pigments and the like are generally deficient in one or more desirable properties and/or require special compatible diluents or carriers for the preparation of greases from said gelling agents and/or special techniques for making said greases, such as temperature controls both with regard to heating and cooling the grease, equipment and the like. Thus, greases made from soaps are generally restricted in the base which can be used for making such greases. For example, greases made with soda soaps and mineral oil require a rather high viscosity oil whereas with lithium soap, a low viscosity oil is preferred. Some soaps, e. g. sodium soap, are not compatible with certain carriers such as organic esters (dioctyl phosphate) for making greases, while other soaps are compatible with these same esters. Another serious limitation of conventional soap-gelled grease is that generally elevated temperatures are required for making the grease and thereafter the grease must be cooled in a critical manner in order to obtain a grease product of desired structure and stability. In addition, grease made with conventional soaps generally tend to deteriorate due to oxidation, to age harden and to bleed and are not very resistant to shear as well as other types of mechanical forces which are exerted on grease under various working conditions.

Synthetic greases in which the above-mentioned gelling agents are used, and/or the base carrier is synthetic, also possess properties which are undesirable in greases, such as their inability to resist the action of water, and their tendency to cause bleeding, corrosion, abrasion, and their inability to resist mechanical stresses.

It is an object of this invention to produce greases from any suitable lubricating liquid by incorporating therein certain organic grease-forming agents. It is another object of this invention to produce a grease in the cold and without application of heat. Still another object of this invention is to produce a smooth and uniform grease, the lubricating and grease properties of which are not dependent upon the heating and/or cooling conditions. Still another object of this invention is to produce greases which are non-corrosive, non-abrasive, mechanically stable and are resistant to oxidation deterioration, age-hardening and bleeding. Furthermore, it is an object of this invention to produce industrial greases without the use of special equipment and with a minimum of the thickening or gelling agent.

The above and other objects of this invention can be attained by simple admixing in the cold of a liquid lubricant or mixtures of more than one liquid lubricant and minor amounts of soap-aerogels. Soap-aerogels possess the unique property of forming greases in the cold with a wide range of types of mineral oil and/or synthetic oil and the greases so formed are stable both toward chemical and mechanical deterioration or working and are non-corrosive, non-abrasive and the like.

Soap-aerogels can be defined as soap gels which have been desolvated under any suitable conditions so that the original structure of the gels is retained so as to form the respective soap-aerogels, i. e. in which the liquid solvate has been replaced with air or other gases.

Soap-aerogels of this invention can be prepared by various methods which have been used for making aerogels of other materials such as the Kistler process as described in U. S. Patents 2,260,625; 2,249,767; 2,188,007 and 2,093,454.

The soaps from which the soap-aerogels can be made may be metal or organic base salts of fatty materials and mixtures thereof. Saponifiable materials which may be used to form soaps can be fats and oils and derivatives thereof such as fatty acids and the like obtained from animal, vegetable, marine and/or fish origin, as well as from miscellaneous sources such as from oxidized petroleum products, petroleum sulfonic acids, naphthenic acids, tall oil fatty acids, rosin acids, etc.

Specifically, the natural fats and fatty acid materials derived therefrom which can be used to form soaps include:

I. Animal: Tallow (beef, mutton, goat), etc., lard oil, bone oil, neat's-foot oil, wool fat, horse fat oil, etc.
II. Vegetable oils: Castor oil, cashew nut oil, peanut oil, cocoanut oil, jojoba seed oil, olive oil, palm oil, corn oil, cottonseed oil, rapeseed oil, ravison oil, sesame oil, soya bean oil, linseed oil, etc.
III. Marine and fish oils: Codfish oil, codliver oil, dog fish oil, dolphin oil, herring oil, menhaden oil, porpoise oil, salmon oil, sardine oil, seal oil, shark oil, whale oil, etc.
IV. Hydrogenated residuum or distillate fractions obtained from any of the oils listed above.
V. Specific fatty acids which can be used to form the soap may include:
  (a) Saturated alkyl monocarboxylic acids: capric, undecylic, lauric, myristic, palmitic, stearic, arachidic, lignoceric, montanic, melissic acids, etc.
  (b) Unsaturated alkyl monocarboxylic acids: oleic, linoleic, erucic, clupanodonic, linolenic, brassidic, elaeostearic, stearoleic acids, etc.
  (c) Hydroxy alkyl carboxylic acids: dimethyl hydroxy caprylic, dimethyl hydroxy capric, ricinoleic, 12-hydroxy stearic, 1,10-dihydroxy stearic acid, 4-hydroxy palmitic acid, linustic, sativic, lanoceric, dihydroxy behenic acids, etc. The preferred hydroxy fatty acids are those in which the hydroxy group is at least 12 carbon atoms removed from the carboxy groups.
  (d) Keto acids: licanic, 12 keto stearic, 13 keto behenic, jojoba oil fatty acids, etc.
VI. Miscellaneous acids: Acids produced by oxidation of hydrocarbons, e. g., paraffin wax, mercapto oleic acid, mercapto stearic acid, amino fatty acids, alkyl succinic acid, alkyl malonic acid and the like.

Mixtures of fatty materials and derivatives thereof can be used to form the soap. For example, aero-soaps for the preparation of grease composition can be made from mixture of fatty materials derived from such oils as vegetable and marine oils and/or their derivatives, and more specifically soaps can be formed by using 10 to 90% of a fatty acid and 90 to 10% of a fatty oil, e. g. 10 to 90% of a hydroxy fatty acid and 90 to 10% of a hydrogenated fatty oil. When using such mixture it is preferable to keep the fatty acid, such as hydrogenated fish oil fatty acids, in the range of from 50% to 90% and the hydrogenated oil, such as hydrogenated castor oil, 10% to 50% of the fatty mixture.

The soap may be made by saponifying the above type fatty materials or their mixtures, with metal oxides, hydroxides, carbonates, etc., or mixtures of several basic metal compounds, or organic bases. Specifically, the saponifying agents may be derived from basic compounds of following metal or from organic bases.

A. Metals selected from the periodic table, e. g.,
    Group I—lithium, sodium, potassium, rubidium and cesium.
    Group II—calcium, strontium, barium, beryllium, magnesium, zinc, cadmium.
    Group III—aluminum, gallium, indium.
    Group IV—zirconium, tin, lead.
    Group V—bismuth.
    Group VI—chromium.
    Group VII—manganese.
    Group VIII—iron, cobalt, nickel.

B. Organic bases such as organic nitrogen bases, e. g., cyclohexylamine, trimethyl cyclohexylamine, ethanolamine, dodecylamine, amyl hexylamine, dicyclohexylamine, triamylamine, quaternary ammonium bases, etc.

The alkali or alkaline earth metal (e. g., sodium, lithium, calcium, barium, strontium and magnesium) soaps of fatty acids, as well as aluminum and zinc fatty acid soaps are particularly preferred for making soap-aerogels for the preparation of greases therefrom. The main object in preparing soap-aerogels or aero-soaps is to prevent shrinkage or collapse of the gel or soap fibre structure after the solvent present in the soap gel is removed and is replaced by air or another gas.

Broadly described, a suitable soap-aerogel can be made as follows: An ordinary soap is formed in situ in, or introduced into, a suitable hydrocarbon solvent, such as a mineral lubricating oil, a high molecular weight aliphatic hydrocarbon such as cetane, a liquid alkyl aromatic hydrocarbon such as methyl naphthalene, and the like, and the mixture heated to a grease making temperature therefor (300 to 500° F. or higher) under agitation. The resulting gel is cooled as desired and the solvent is removed by extraction with a low boiling paraffinic hydrocarbon or suitable and compatible liquefied gas, e. g. liquefied $CO_2$, etc. The temperature of the soap-solvent system is raised above the critical temperature for the solvent in a suitable vessel (the pressure being maintained above the critical pressure during heating) and thereafter the pressure is reduced (released) at this temperature and the solvent material thus removed. The desolvated soap-fibers or soap-aerogels obtained in the manner described maintain their original structure and are utilized for forming greases or they may be used for various other purposes such as forming emulsions, cleaning compositions, lubricating fluids and the like.

In making soap-aerogels, it is preferable to select the displacing fluid such that its critical temperature is below that of the phase transition temperature of the soap; particularly in cases where it is desired to have the soap in the form which is stable below the transition temperature of the soap.

Representative soap-aerogels which can be made by the freezing-sublimation technique are: Sodium stearate-aerogel, sodium 12-hydroxy stearate-aerogel, sodium soap of hydrogenated fish oil fatty acid-aerogel, lithium stearate-aerogel, lithium oleate-aerogel, aluminum stearate-aerogel, sodium soap of mixed fatty materials, e. g. 12-hydroxy stearic acid and hydrogenated castor oil-aerogel, calcium stearate-aerogel, barium stearate-aerogel, strontium stearate-aerogel, strontium oleate-aerogel, lead stearate-aerogel, lead palmitate-aerogel, lead oleate-aerogel, magnesium palmitate-aerogel, etc. Instead of making the usual soap from the saponifiable agents and thereafter converting it to a soap-aerogel, a pre-made soap such as sodium or lithium stearate can be converted to its aero-soap form by the Kistler or freezing-sublimation technique or any other suitable means.

To more clearly illustrate the present invention, the following examples are presented. It is to be understood, however, that various modifications can be resorted to without departing from the spirit and scope of the invention.

A soap-aerogel or aero-soap was prepared in the following manner: A mixture of hydrogenated fish oil acids and hydrogenated castor oil in the ratio of 7:1, respectively, was melted with twice its weight of mineral oil at about 175° F. and aqueous soda caustic solution was added to the mixture, sufficient to saponify the fatty materials. The soap formed was vigorously stirred to form a slurry and heated to drive off the water. While heating the soap-oil mixture, additional hot mineral oil at about 250° F. was slowly blended into the mixture in an amount so that the final composition would contain a desired amount of soap. In the present case an amount of oil was added so that the end product contained between 8% and 9% soap. The final mixture was heated to about 390° F. and then quickly transferred to suitable containers for heat conditioning to form a stable grease.

The aero-soap (soap-aerogel) fibers were prepared from this grease in the following manner: The oil in the grease was extracted with butylene at room temperature. The butylene extraction was continued until no more oil was recoverable from the exiting butylene. The butylene in the butylene soap mixture was displaced by ethylene at ice temperature and at a pressure of between 700 and 800 pounds in a suitable pressure container. The ethylene was then released from the ethylene-soap mixture, after heating to above the critical temperature of the ethylene while maintaining the pressure above the critical pressure, leaving behind the aerogel of the sodium soap of hydrogenated fish oil acids and hydrogenated castor oil fatty acids. This soap-aerogel can be admixed with any type of mineral oil or lubricating liquid, in the cold, to form grease. The soap-aerogel is suitably mixed with the lubricating liquid under vacuum to form the grease.

To specifically illustrate that a substantially perfect soap-aerogel is obtained by the process described above the following data is presented.

EXAMPLE I

About 5.32 gm. of sodium soap-oil-gel obtained in the manner described above and containing about 8.67% by wt. of sodium soap was washed with butylene to remove the mineral oil. The butylene was then entirely replaced by ethylene. The ethylene was released after heating to above its critical temperature in a suitable pressure vessel and the resulting recovered sodium soap-aerogel product was found to be 8.85% by wt. of the original gel. This aero-soap grease was reconstituted by adding mineral oil to the aero-soap in the cold and it was found that the grease formed was 95.5% by wt. of the original grease.

EXAMPLE II

A similar Na-grease-gel as described above, in addition containing about 0.11% of a polyethylene glycol having an average molecular weight of 1500, was prepared and after being milled to a grease it was desolvated in the manner described. The resulting aero-soap was reconstituted to a grease, by adding mineral oil to it in the cold and it was found that the weight of the reconstituted grease was 85.0% of the original grease. This grease was stable on storage and under dynamic conditions and was non-corrosive.

EXAMPLE III

Other samples of Na-aero-soap obtained in the manner described above were reconstituted to greases by adding polymeric silicone or dioctyl phthalate to them and it was found that the weight of the reconstituted greases was approximately 80% of the original grease. On the other hand polymeric silicone or dioctyl phthalate would not make a grease by using ordinary Na soap and the usual grease cooking procedure. In all cases any additional amount of base lubricant such as mineral oil, esters, etc. can be easily stirred into or admixed with the reconstituted grease. This grease was stable and non-corrosive.

EXAMPLE IV

A water gel containing about 8% sodium soap of a mixture of hydrogenated fish oil fatty acids and hydrogenated castor oil (in the ratio of 7:1) was prepared and dehydrated in a suitable pressure vessel without shrinking or collapsing the soap fibers by quickly freezing the water in the gel in a carbon dioxide-acetone bath and subliming off the frozen medium at a low pressure of from about 0.5 to 0.1 mm. Hg and at about −20° C. About 7% to 10% of the soap-aerogel thus obtained was mixed with a mineral oil base in the cold until a homegeneous mass of grease consistency was obtained.

EXAMPLE V

A water gel containing about 8% sodium stearate and about 0.1% of polyethylene oxide (mol. wt. 1500) was prepared and dehydrated in a suitable pressure vessel without shrinking or collapsing the soap fibers by quickly freezing the water in the gel in a carbon dioxide-acetone bath and subliming off the frozen liquid at a low pressure of from about 0.05 to 0.1 mm. Hg and at about −20° C. About 10% of the sodium stearate-aerogel thus obtained was admixed with mineral oil in the cold until a homogeneous mass of grease consistency had been obtained, and in storage was stable and non-corrosive.

EXAMPLE VI

A water gel containing about 8% calcium stearate was prepared and dehydrated in a suitable pressure vessel without shrinking or collapsing the soap fibers by quickly freezing the water in the gel in a carbon dioxide-acetone bath and subliming off the frozen medium at a low pressure of from about 0.05 to 0.1 mm. Hg and at about −20° C. About 10% of the calcium stearate-aerogel thus obtained was admixed with mineral oil in the cold until a homogeneous mass of grease consistency has been attained and in storage was stable and non-corrosive.

EXAMPLE VII

A water gel containing about 8% sodium stearate was prepared and dehydrated in a suitable pressure vessel without shrinking or collapsing the soap fibers by quickly freezing the water in the gel in a carbon dioxide-acetone bath and subliming off the frozen medium at a low pressure of from about 0.05 to 0.1 mm. Hg and at about −20° C. About 10% of the sodium stearate-aerogel thus obtained and about 0.1% of polyethylene oxide (mol. wt. 1500) were admixed with di(2-ethylhexyl) sebacate in the cold until a homogeneous mass of grease consistency had been attained. This grease was stable in storage and was resistant to oxidation and was non-corrosive.

EXAMPLE VIII

A water gel containing about 8% sodium stearate was prepared and dehydrated in a suitable pressure vessel without shrinking or collapsing the soap fibers by quickly freezing the water in the gel in a carbon dioxide-acetone bath and subliming off the frozen medium at a low pressure of from about 0.05 to 0.1 mm. Hg and at about −20° C. About 10% of the sodium stearate-aerogel thus obtained and about 0.1% of polyethylene oxide (mol. wt. 1500) were admixed with dimethyl silicone polymer until a homogeneous mass of grease consistency had been attained. The grease was non-corrosive and was stable in storage and under dynamic conditions.

EXAMPLE IX

A water gel containing about 8% sodium stearate and about 0.1% of polyethylene oxide (mol. wt. 1500) was prepared and dehydrated in a suitable pressure vessel without shrinking or collapsing the soap fibers by quickly freezing the water in the gel in a carbon dioxide-acetone bath and subliming off the frozen medium at a low pressure of from about 0.05 to 0.1 mm. Hg and at about −20° C. About 10% of the sodium stearate-aerogel thus obtained was admixed with a mixture of mineral oil and alkylated naphthalene (the mineral oil being present in predominant amount) until a homogeneous mass of grease consistency had been attained. The grease was stable and non-corrosive.

EXAMPLE X

A lithium stearate-aerogel soap was prepared in substantially the same manner as used in Example I for preparing the soda soap aerogel. About 8% of this lithium stearate-aerogel soap in a mineral oil made an excellent stable grease which was non-corrosive.

The following soap aerogel materials and their mixtures have been found to be excellent for forming greases with mineral oil or various organic lubricating liquids and compatible mixtures thereof:

Lithium soap-aerogel-mineral oil
Potassium soap-aerogel-mineral oil
Calcium soap-aerogel-mineral oil
Barium soap-aerogel-mineral oil
Aluminum soap-aerogel-minerol oil
Zinc soap-aerogel-mineral oil
Lead soap-aerogel-mineral oil
Lithium soap-aerogel-di(2-ethylhexyl) sebacate
Lithium soap-aerogel-di(2-ethylhexyl) phosphate
Lithium soap-aerogel-di(2-ethylhexyl) phthalate
Lithium soap-aerogel-di(1-ethylpropyl) azelate
Lithium soap-aerogel-tricresyl phosphate
Lithium soap-aerogel-copolymer of ethylene oxide and propylene oxide
Lithium soap-aerogel-synthetic polyethylene oil
Lithium soap-aerogel-copolymer of alkylene glycol and alkylene oxides
Calcium soap-aerogel-di(2-ethylhexyl) sebacate
Calcium soap-aerogel-di(2-ethylhexyl) phosphate
Calcium soap-aerogel-di(2-ethylhexyl) phthalate
Calcium soap-aerogel-di(1-ethylpropyl) azelate
Calcium soap-aerogel-tricresyl phosphate
Calcium soap-aerogel-copolymer of ethylene oxide propylene oxide and monohydric alcohol
Calcium soap-aerogel-synthetic polyethylene oil
Calcium soap-aerogel-copolymer of alkylene glycol and alkylene oxides
Aluminum soap-aerogel-di(2-ethylhexyl) sebacate
Aluminum soap-aerogel-di(2-ethylhexyl) phosphate
Aluminum soap-aerogel-di(2-ethylhexyl) phthalate
Aluminum soap-aerogel-di(1-ethylpropyl) azelate
Aluminum soap-aerogel-copolymer of ethylene oxide and propylene oxide
Aluminum soap-aerogel-synthetic polyethylene oxide
Aluminum soap-aerogel-copolymer of alkylene glycol and alkylene oxides
Lead soap-aerogel-di(2-ethylhexyl) sebacate
Lead soap-aerogel-di(2-ethylhexyl) phosphate
Lead soap-aerogel-di(2-ethylhexyl) phthalate
Lead soap-aerogel-di(1-ethylpropyl) azelate
Lead soap-aerogel-copolymer of ethylene oxide and propylene oxide
Lead soap-aerogel-synthetic polyethylene oil
Lead soap-aerogel-copolymer of alkylene glycol and alkylene oxides
Sodium soap-aerogel and lithium soap-aerogel-mineral oil
Sodium soap-aerogel and lithium soap-aerogel-dioctyl phthalate Sodium soap-aerogel and lithium soap-aerogel-di(2-ethylhexyl) sebacate
Sodium soap-aerogel and aluminum soap-aerogel-di(2-ethylhexyl) sebacate
Lithium soap-aerogel and aluminum soap-aerogel-dioctyl di(2-ethylhexyl) sebacate It is also well known in the art that greases cannot be made from conventional soaps derived from low molecular weight carboxylic acids such as those having 12 or less carbon atoms because such soaps are insoluble in mineral oils or tend to precipitate out at elevated temperatures. Aerogel soaps of low molecular weight carboxylic acids such as sodium caprate aerogel can be used for making greases of this invention.

The amount of soap aerogel material used to form a grease depends upon a number of factors such as the type of aerogel soap used, the lubricating base used and the intended purpose of the grease. Generally, the amount of aerogel material used to form a suitable grease may vary from 1% to 40% by weight and preferably from 3% to 14% by weight.

As already indicated, the base lubricant for forming aerogel greases of this invention may be selected from a wide variety of natural and synthetic lubricants. Mineral oils of any viscosity range varying from about 40 to 2,000 SUS at 100° F. and having a viscosity index of from below zero to about 120 and mixtures thereof can be used, said mineral oils being obtained from any petroleum crude. A preferred mineral oil is a refined one which has a viscosity of from about 50 to 100 SUS at 100° F. while another preferred oil fraction is one having a viscosity of 300 to 700 SUS at 100° F., a viscosity index of from about 40 to 70 and an average molecular weight of from about 350 to 550. Mixtures of mineral oil and fixed oils such as castor oil, lard oil and the like can be used as well as organic synthetic lubricants and mixtures thereof, such as:

I. Synthetic lubricants produced by the Fischer-Tropsch, Synthol, Synthine and related processes, e. g.,
   A. Polymerization of olefins such as ethylene, butylene, and the like, and their mixtures in presence of a Friedel-Crafts or other type catalysts under elevated temperatures and pressures as well as lubricating bases as described in U. S. Patent 2,526,986.
   B. Polymerization of unsaturated hydrocarbons in presence of a catalyst and then condensing said polymerized product with an aromatic hydrocarbon such as xylene, benzene and naphthalene.
   C. Oxidation of polymerized olefins of lubricating range as noted under A and B.
   D. Conversion of natural gas to carbon monoxide and hydrogen, followed by catalytic reaction under elevated temperature and pressure to produce hydrocarbons of lubricating range (Synthol process).

II. Bergius process for producing synthetic lubricants, e. g.,
   A. Hydrogenation of coal, peat, and related carbonaceous materials under pressure and elevated temperature in presence of a catalyst.
   B. Hydrogenation of asphalts, petroleum residues and the like.

III. Voltolization process for producing synthetic lubricants, e. g.,
   A. Voltolization of fatty materials such as fatty oils.
   B. Voltolization of mixtures of fatty oils and petroleum hydrocarbons.
   C. Voltolization of unsaturated hydrocarbons, their mixtures, and the like.

IV. Organic synthetic lubricants:
   A. Complete alkyl esters of organic acids, e. g.,
     Alkyl lactates
     Alkyl oxalates
     Alkyl sebacates [di(2-ethylhexyl) sebacate]
     Alkyl adipates [di(2-ethylhexyl adipate]
     Alkyl phthalates (dioctyl phthalates)
     Alkyl ricinoleates (ethyl ricinoleate)
     Alkyl benzoates
   B. Alkyl or alkylaryl esters of inorganic acids, e. g.,
     Tricresyl phosphate
     Trioctyl phosphate
     Dibutyl trichloromethanephosphonate
     Trixylenyl phosphate
     Tributyl phosphate
     Triethyl phosphate V. Synthetic lubricants made from polymerization of alkylene oxides at elevated temperatures in the presence of catalysts such as iodine, hydrogen iodide, etc.
   A. Polymers of:
     Ethylene glycol
     Trimethylene glycol
     Propylene glycol
     Tetramethylene glycol
     Hexamethylene glycol
     Pentamethylene glycol
   B. Copolymers of:
     Trimethylene glycol and triethylene glycol
     Trimethylene glycol and hexamethylene glycol
     Trimethylene glycol and $\beta$-methyltrimethylene glycol
     Trimethylene glycol and diethylene glycol
   C. Copolymers prepared from certain peroxides at elevated temperatures and in the presence of alkali metal base (KOH) or $BF_3$-ether catalyst, e. g.,
     Ethylene oxide and propylene oxide
     Isobutylene oxide and propylene oxide
   D. Sulfur-containing reaction products obtained by treating allyl alcohol, divinyl ether, diallyl ether, dimethallyl ether and glycols with $H_2S$ in the presence of a catalyst such as toluene sulfonic acid, e. g.,
     Dihydroxy dipropyl sulfide
     Trimethylene glycol and dihydroxy dipropyl sulfide
     Trimethylene glycol and hydroxy diethyl sulfide VI. Polymers obtained from oxygen-containing heterocyclic compounds, e. g.,
   Polymerization of tetrahydrofuran in the presence of a catalyst.

VII. Silicone polymers, e. g.,
   Polyalkyl silicone polymers (dimethyl silicone polymers)
   Alkylaryl silicone polymers, e. g. (methyl phenyl silicone polymers)

VIII. Fluorocarbon oils, e. g.,
   Fluorinated petroleum fractions, etc.

If desired, additive agents can be admixed with aerosoap greases of this invention.

A particularly desirable stabilizing agent which appears to exert synergistic effect on grease containing the aero-soap products of this invention are the alkylene glycol and/or alkylene thio glycol polymers as well as their mono esters and ether polymeric derivatives. The alkylene glycol polymeric materials can be represented by the following general structural formula:

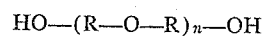

$$HO\text{---}(R\text{---}O\text{---}R)_n\text{---}OH$$

wherein $n$ is an integer and R is a hydrocarbon radical or a hydrocarbon radical containing substituent groups such as hydroxy groups and the like. Preferably, the polymeric alkylene glycols as represented by the above general formula should be such that the factor $n$ times the number of carbon atoms in the R symbols should be at least 6 or more and the molecular weight should be at least 200.

The polymerized higher polyalkylene glycols having between 2 and 6 carbon atoms in the alkylene group are most effective as additives of this invention, and those containing the ethylene and propylene groups are preferred. The average molecular weight of the polyalkylene glycols may be from about 200 to about 7,000, and the preferred molecular weight being from about 600 to 4,000.

It is desired to point out that the higher polyalkylene glycols are composed of mixtures of several polymers, for example, a polyethylene glycol having an average molecular weight of 400 consists of various glycols varying from a minor amount of monoethylene glycol and increasing up to the pentadecaethylene glycol. Therefore, it is the average molecular weight which is specified and wherein the present specification polyalkylene glycols or polyethylene glycols are referred to, they define the higher glycols having an average molecular weight in excess of 200 and preferably in excess of 400, those with an average molecular weight of between about 600 to 1500 being very effective in carrying out the present invention.

In lieu of the polyalkylene glycols, the partial or complete ester, and ether derivatives thereof can be used. The esters can be made from a variety of acids having from 1 to about 22 carbon atoms and preferably from about 10 to 18 carbon atoms. Acids which may be used are the aliphatic, aromatic, cyclic, carboxylic and/or sulfonic acids and the like. Fatty acids and especially the higher fatty acids are preferred and include such acids as lauric, myristic, palmitic, stearic, arachidic, behenic, oleic, ricinoleic, hydroxy stearic, phenyl acetic, phenyl stearic acids and the like. However, such acids as naphthenic acid, salicylic acid and phthalic acid and the like, may be used to form the esters. Specific examples of esters of this type are the polyethylene glycol monostearate, polyethylene glycol monooleate and the like.

The amount of polyalkylene glycol or derivatives thereof or other anti-bleeding agents which are suitably used depends upon the aero-soap concentration and in part upon the type of oil base used. However, it has been found that it is not necessary to use more than 1% by weight of these additives although larger amounts can be used if desired. Generally, effective results are obtained with concentrations ranging from 0.01 to about 0.5% and preferably when kept within the range of between about 0.05 to about 0.25% by weight.

Minor amounts of oxidation inhibitors can be added to grease compositions of this invention such as: N,N'-dibutyl paraphenylene diamine. Also effective as oxidation inhibitors are alpha- or beta-naphthylamine, alpha-alpha-, beta-beta-, or alpha-beta-dinaphthylamine, diphenylamine, N,N'-tetramethyldiamino diphenylmethane, petroleum alkyl phenols, and 2,4-ditertiary butyl 6-methyl phenol.

Corrosion inhibitors which are particularly applicable with compositions of this invention are $C_{15}H_{31}SO_2NHCOONa$ $NaNO_2$, $Mg(OH)_2$, Na petroleum sulfonate, dicyclohexylamine nitrite, amino nitroso compounds, oxazoline salts of fatty acids, polycarboxylic acids, e. g. alkyl succinic acid, etc.

Extreme pressure agents can be added to such greases and the preferred comprise esters of phosphorus acids such as triaryl, hydroxy alkyl, aryl or aralkyl phosphates, thiophosphates or phosphites, neutral aromatic sulfur compounds such as diaryl sulfides and polysulfides, e. g., diphenyl sulfide, dicresol sulfide, dibenzyl sulfide, diphenyl selenide and diselenide, dicresol selenide and polyselenide, sulfurized fatty oils or esters of fatty acids and monohydric alcohols, e. g., sperm oil, jojoba oil, etc., in which the sulfur is tightly bound; sulfurized long-chain olefins obtained by dehydrogenation or cracking of wax; sulfurized phosphorized fatty oils, acids, esters and ketones, phosphorus acid esters having sulfurized organic radicals, such as esters of phosphoric or phosphorous acids with sulfurized hydroxy fatty acids (sulfurized ricinoleic acid); chlorinated hydrocarbons such as chlorinated paraffins, aromatic hydrocarbons, terpenes, mineral lubricating oils, etc., or chlorinated esters of fatty acids containing the chlorine in positions other than alpha position.

Additional ingredients which can be added are antiwear agents such as oil-soluble urea or thiourea derivatives, e. g., urethanes, allophanates, carbazides, carbazone, thiocarbamates, polyisobutylene, polyvinyl esters, etc.; VI improvers such as polyisobutylene having a molecular weight of about 800, voltolized paraffin wax, unsaturated polymerized esters of fatty acids and monohydric alcohols, etc.; oiliness agents such as stearic and oleic acids and pour point depressors such as polyacrylic acid esters and hydrocarbons to lower the pour point of the lubricant.

Reconstituted greases made from soap-aerogels in addition to being easily prepared without the necessity of heat or special equipment are compatible with various liquids and form greases of desired consistency and stability, which greases are non-abrasive and non-corrosive.

Comparative results of working stability of greases prepared with ordinary soap and soap-aerogel using various bases as measured by the Shell roll test as determined by the Shell method series 466/46 are given below:

Table I.—*Work stability of soap greases*

[Micropenetration values]

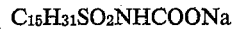

| Composition | Hours of Rolling Grease, Micropenetration | | |
|---|---|---|---|
| | 0 | 4½ | 16 |
| A. 8% Na soap of hydrogenated fish oil acids and hydrogenated castor oil (7:1 ratio respectively) made by conventional grease making method at 300-450° F. with mineral oil, 100 SUS at 210° F. | 160 | 290 | |
| B. 8% Na soap as (A) using spray oil | 200 | Fluid | |
| C. 8% Na soap as (A) using dioctyl phthalate or silicone oil. | No Grease Formed. | | |
| D. 8% Na soap aerogel reconstituted with mineral oil 100 SUS at 210° F. in the cold, soap made in accordance with Ex. I. | 163 | 295 | |
| E. 8% Na soap aerogel reconstituted with mineral spray oil in the cold, soap made in accordance with Ex. II. | 165 | 300 | |
| F. 8% Na soap aerogel reconstituted with dioctyl phthalate in the cold, soap made in accord. with Ex. III. | 85 | 133 | 150 |
| G. 8% Na soap aerogel reconstituted with polymeric dimethyl silicone oil made by Dow Corning. | 90 | 150 | 200 |
| H. 8% Li soap aerogel reconstituted with mineral lubricating oil, 100 SUS at 210° F. | 165 | 300 | |

The work stability as determined by the roll test of an ordinary soap grease (A) and of a soda soap-aerogel grease (D), both made with different samples of the same mineral lubricating oil are compared graphically in Fig. 1.

In order to show the non-corrosive nature of greases of this invention as compared with conventional inorganic aerogel greases such as Kistler's silica aerogel grease, as disclosed in U. S. Patent 2,260,625, the following compositions were prepared and tested by the Shell Development Wet Wheel-Bearing Grease Test (SDWW Grease Test) and the Roller Bearing Corrosion Rig Test (R. B. C. Rig Test). The results are shown in Table II.

Composition XX (Kistler's composition U. S. 2,260,625): Mineral oil base grease containing 8% silica gel prepared by the Kistler method.

Composition D as identified in Table I: Mineral oil, 60 SUS at 100° F., containing 8% sodium soap aerogel.

Composition E as identified in Table I: Mineral oil, 60 SUS at 100° F., containing 8% sodium soap aerogel and 0.045 to polyethylene glycol (M. W. 1500).

Composition H as identified in Table I: Mineral lubricating oil, 100 SUS at 210° F., containing 8% lithium stearate aero-soap.

Table II.—Corrosion tests on greases

| Grease Composition | SDWW Grease Test | R. B. C. Rig Test |
|---|---|---|
| Composition XX | Heavy Corrosion | Heavy Corrosion. |
| Composition D | No Corrosion | No Corrosion. |
| Composition E | ......do | Do. |
| Composition H | ......do | Do. |

That aero-soap greases of this invention, such as Composition H, are more stable in storage (resist age-hardening) than silica gel greases, such as Composition XX, is evidenced from the coefficient of gelation which can be represented by the equation:

Coefficient of gelatin =
$$\frac{\text{Storage micropenetration (room temp.)}}{\text{Initial micropenetration}} \times 100$$

Composition: Coefficient of gelation [1]
Composition XX _____ 40
Composition H _____ 80

[1] 100 = perfect; 50 and below = very poor.

Various soap-mineral oil compositions were prepared as indicated below and the results of attempts to make greases thereof under different conditions as shown in Table III.

The results show that greases can be formulated from soap aerogels in the cold and with any viscosity mineral oil whereas with greases made from ordinary soaps the viscosity range of the mineral oil is critical and for sodium soap the viscosity of the oil must be within the range of 1.6 to 5.4 cs. at 160° C. and that grease must be made at elevated temperatures of 350–450° F.

COMPOSITIONS [1]

Composition I: Mineral oil having a viscosity at 160° C. of below 1.6 cs. containing 8% sodium soap aerogel.
Composition II: Mineral oil having a viscosity at 160° C. of above 5.8 cs. containing 8% sodium soap aerogel.
Composition III: Mineral oil having a viscosity at 160° C. of 4.5 cs. containing 8% sodium soap aerogel.
Composition IV: Mineral oil having a viscosity at 160° C. of 2.3 cs. containing 8% sodium soap aerogel.
Composition V: Mineral oil having a viscosity at 160° C. of 1.6 cs. containing 8% sodium soap.
Composition VI: Mineral oil having a viscosity at 160° C. of 5.8 cs. containing 8% sodium soap.
Composition VII: Mineral oil having a viscosity at 160° C. of 2.3 cs. containing 8% sodium soap.
Composition VIII: Mineral oil having a viscosity at 160° C. of 4.5 cs. containing 8% sodium soap.

[1] The soaps were anhydrous soda base soaps made from a mixture of hydrogenated fish oil acids and hydrogenated castor oil in the ratio of 7:1.

Table III.—Grease preparation

| Composition | Method of Preparation of Grease | |
|---|---|---|
| | Cold (Room Temp.) | Hot (350–450° F.) |
| Composition I | Excellent stable grease. | Grease having very poor work stability. |
| Composition II | ......do | No grease formed. |
| Composition III | ......do | Grease having very good work stability. |
| Composition IV | ......do | Good grease having relatively poor work stability. |
| Composition V | No grease formed | Grease having very poor work stability. |
| Composition VI | ......do | No grease formed. |
| Composition VII | ......do | Grease having relatively poor work stability. |
| Composition VIII | ......do | Good grease having good work stability. |

Greases of this invention are particularly applicable in machinery operating under high speeds and high temperatures. They are excellent for ball bearing lubrication and may be used in refrigerators, washing machines, electric motors, conveyor systems and the like. Greases of this invention are also applicable for general automotive uses and are excellent aircraft greases, industrial greases and the like.

This application is a continuation-in-part of our co-pending application Serial No. 30,466, filed June 1, 1948, now abandoned.

We claim as our invention:

1. The method of preparing a grease composition which comprises extracting a grease comprising essentially a mineral lubricating oil and a soap of high molecular weight carboxylic acid, with a normally liquid solvent for said oil to remove substantially all of the mineral lubricating oil from said grease, displacing said normally liquid solvent with a liquefied normally gaseous second solvent, heating said soap and second solvent above the critical temperature of the solvent while maintaining the solvent in a liquid state, evaporating the solvent from said soap above the critical temperature thereof, whereby a soap aerogel is formed, and dispersing said aerogel in a second mineral lubricating oil, whereby a second grease composition is formed.

2. The method of preparing a grease composition which comprises extracting a grease comprising essentially a mineral lubricating oil and a lithium soap of hydrogenated castor oil acids, with a low boiling paraffinic hydrocarbon to remove substantially all of said mineral lubricating oil from said grease, heating the soap dispersed in the low boiling hydrocarbon to a temperature above the critical temperature of said hydrocarbon while maintaining the latter in a liquid state, evaporating the hydrocarbon from the soap above the critical temperature of the hydrocarbon whereby a soap aerogel is formed and dispersing said aerogel in a second mineral lubricating oil whereby a second grease composition is formed.

3. A method of obtaining a substantially liquid-free soap of expanded structure from a lubricating grease, comprising essentially a normally liquid vehicle and a soap of expanded structure, which method comprises displacing the liquid vehicle from the soap structure with a liquid solvent having a critical temperature below the melting point of the soap, in which solvent the liquid vehicle is substantially soluble and in which the soap is substantially insoluble, increasing the temperature of the solvent-containing soap structure to a temperature approximating the critical temperature of the solvent but below the melting point of the soap while maintaining a pressure thereon at least equal to the vapor pressure of the solvent at such increasing temperatures and removing the solvent from the soap structure at a temperature between about the critical temperature of said solvent and the melting point of said soap.

4. A method of obtaining a substantially liquid free soap of expanded structure from a lubricating grease comprising essentially a mineral lubricating oil and a soap of expanded structure, which method comprises selectively extracting the mineral lubricating oil from the soap structure with a liquid solvent having a critical temperature below the melting point of the soap, in which solvent the soap is substantially insoluble, increasing the temperature of the solvent-containing soap structure to a temperature approximating the critical temperature of said solvent but below the melting point of the soap while maintaining a pressure thereon sufficient to maintain the solvent substantially liquid and slowly removing the solvent from the soap structure at a temperature between about the critical temperature of the solvent and the melting point of the soap.

5. A method of removing the liquid vehicle from a lubricating grease, comprising a mineral lubricating oil and a soap of expanded structure, which method comprises selectively extracting the mineral lubricating oil from the soap with a liquid solvent having a critical temperature below the melting point of the soap, in which solvent the soap is substantially insoluble, increasing the temperature of the solvent-containing soap structure to a temperature above about the critical temperature of the solvent but below the melting point of the soap while maintaining the solvent substantially liquid at such increasing temperatures and removing the solvent at a temperature between about the critical temperature of the solvent and the melting point of the soap.

6. The method of claim 5 in which the liquid solvent is a hydrocarbon solvent.

7. The method of claim 5 in which the solvent is a liquefied normally gaseous hydrocarbon of not more than 4 carbon atoms.

8. A method of preparing a lubricant grease which comprises selectively extracting the liquid vehicle from a lubricant grease, comprising essentially a normally liquid vehicle and a soap of expanded structure, with a liquid solvent having a critical temperature below the melting point of the soap, in which solvent the soap is substantially insoluble, increasing the temperature of the solvent-containing soap structure to a temperature approximating the critical temperature of the solvent but below the melting point of the soap while maintaining a pressure thereon at least equal to the vapor pressure of the solvent at such increasing temperatures, removing said solvent from said soap structure at a temperature between about the critical temperature of the solvent and the melting point of the soap and introducing to the expanded soap structure a normally liquid vehicle possessing lubricating properties.

9. A method of preparing a lubricant grease which comprises selectively extracting a mineral lubricating oil from a lubricant grease, comprising essentially a mineral lubricating oil and a soap of expanded structure, with a liquid solvent having a critical temperature below the melting point of the soap, in which solvent the soap is substantially insoluble, increasing the temperature of the solvent-containing soap structure to a temperature approximating the critical temperature of said solvent but below the critical temperature of the soap while maintaining a pressure thereon at least equal to the vapor pressure of said solvent at such increasing temperatures, slowly removing said solvent from said soap structure at a temperature between about the critical temperature of said solvent and the melting point of the soap and introducing to the expanded soap structure a second normally liquid oleaginous vehicle possessing lubricating properties.

10. The method of claim 9 wherein the second normally liquid oleaginous vehicle is a mineral lubricating oil.

11. The method of claim 9 wherein the second normally liquid oleaginous vehicle is a silicone polymer oil.

12. The soap of expanded soap structure prepared according to the method of claim 3.

13. A method of obtaining a substantially liquid free soap of expanded structure from a lubricating grease, comprising essentially a normally liquid vehicle and a soap of expanded structure, which method comprising replacing said liquid vehicle in said soap structure with a liquefied normally gaseous solvent having a critical temperature below the melting point of the soap, in which solvent the liquid vehicle is substantially soluble and in which the soap is substantially insoluble, increasing the temperature of the solvent-containing soap structure to a temperature approximating the critical temperature of the solvent but below the melting point of the soap while maintaining a pressure thereon at least equal to the vapor pressure of the solvent at such increasing temperatures and removing the solvent from the soap structure at a temperature between about the critical temperature of said solvent and the melting point of said soap.

14. A method of preparing a lubricant grease which comprises replacing the liquid vehicle in a lubricant grease, comprising essentially a normally liquid vehicle and a soap of expanded structure, with a liquefied normally gaseous solvent having a critical temperature below the melting point of the soap, in which solvent the soap is substantially insoluble, increasing the temperature of the solvent-containing soap structure to a temperature approximating the critical temperature of the solvent but below the melting point of the soap while maintaining a pressure thereon at least equal to the vapor pressure of the solvent at such increasing temperatures, removing said solvent from said soap structure at a temperature between about the critical temperature of the solvent and the melting point of the soap and introducing to the expanded soap structure a normally liquid vehicle possessing lubricating properties.

References Cited in the file of this patent

UNITED STATES PATENTS

| | | |
|---|---|---|
| 2,215,955 | Cox | Sept. 24, 1940 |
| 2,260,625 | Kistler | Oct. 28, 1941 |
| 2,397,956 | Fraser | Apr. 9, 1946 |
| 2,455,892 | Fraser | Dec. 7, 1948 |
| 2,636,001 | Browning | Apr. 21, 1953 |